United States Patent [19]
Fujiwara

[11] Patent Number: 6,000,996
[45] Date of Patent: Dec. 14, 1999

[54] GRINDING PROCESS MONITORING SYSTEM AND GRINDING PROCESS MONITORING METHOD

[75] Inventor: Nariaki Fujiwara, Kyoto, Japan

[73] Assignee: Dainippon Screen Mfg. Co., Ltd., Japan

[21] Appl. No.: 09/014,487

[22] Filed: Jan. 28, 1998

[30] Foreign Application Priority Data

Feb. 3, 1997 [JP] Japan .................................. 9-020328

[51] Int. Cl.⁶ .............................. B24B 49/00; B24C 1/08; H01L 21/00
[52] U.S. Cl. ...................... 451/6; 451/5; 451/8; 451/36; 451/286; 451/287; 438/974; 216/85; 216/88; 156/640
[58] Field of Search .................................. 216/38, 84, 85, 216/86, 87, 88, 91; 438/7, 14, 16, 959, 974; 451/5, 6, 8, 11, 271, 285, 287, 288

[56] References Cited

U.S. PATENT DOCUMENTS

| | | | |
|---|---|---|---|
| 5,032,217 | 7/1991 | Tanaka | 156/640 |
| 5,433,650 | 7/1995 | Winebarger | 451/6 |
| 5,492,594 | 2/1996 | Burke et al. | 216/86 |
| 5,658,183 | 8/1997 | Sandhu et al. | 451/5 |
| 5,672,091 | 9/1997 | Takahashi et al. | 451/6 |
| 5,685,766 | 11/1997 | Mattingly et al. | 451/36 |
| 5,695,601 | 12/1997 | Kodera et al. | 156/636.1 |
| 5,838,447 | 11/1998 | Hiyama et al. | 356/381 |
| 5,877,088 | 3/1999 | Samitsu et al. | 438/692 |
| 5,904,609 | 5/1999 | Fukuroda et al. | 451/8 |

*Primary Examiner*—Charles Bowers
*Assistant Examiner*—Hsien Ming Lee
*Attorney, Agent, or Firm*—Ostrolenk, Faber, Gerb & Soffen, LLP

[57] ABSTRACT

A grinding process monitoring system and grinding process monitoring method for monitoring progress of a grinding process by measuring thickness of a film applied to a substrate surface and undergoing the grinding process. A spectrum measuring device for measuring a spectrum of light reflected from the substrate surface has a measuring window opposed to the substrate surface. A measurement region between the measuring window and the substrate surface is filled with a cleaning liquid to form a liquid curtain in the measurement region. While examining bubble characteristic variations occurring in the spectrum due to bubbles present in the measurement region, a moving device is controlled to adjust a spacing between the measuring window and the substrate surface by feedback control to eliminate the bubble characteristic variations. The thickness of the film applied to the substrate surface and undergoing the grinding process is determined, with the spacing between the measuring window and the substrate surface adjusted to eliminate the bubble characteristic variations.

11 Claims, 8 Drawing Sheets

GRINDING PROCESS MONITORING SYSTEM AND GRINDING PROCESS MONITORING METHOD

BACKGROUND OF THE INVENTION (1) Field of the Invention

This invention relates to a grinding process monitoring system incorporated into a grinding apparatus for grinding substrates such as semiconductor wafers, the monitoring system being operable to monitor progress of a grinding process by optically measuring the thickness of a film applied to a surface of a substrate and undergoing the grinding process. The invention relates also to a method of monitoring the grinding process.

(2) Description of the Related Art

With an ever-enlarging scale of integration of semiconductor devices taking place today, circuit wiring has become increasingly minute to diminish spaces between conducting paths. In the case of a photolithographic process for fabricating such circuit boards, the surfaces of semiconductor wafers (substrates) must be smoothed because of reduced focal depths. As one smoothing method, a grinding apparatus is used to smooth a film (insulating film) applied to the surface of a substrate and grind the film down to a target thickness.

In a grinding process performed with such a grinding apparatus, a top ring supports the substrate and presses its surface against an abrasive cloth extended over a turntable. The turntable and top ring (substrate) are rotated independently of each other while a slurry (abrasive solution) is supplied to the abrasive cloth.

This type of grinding apparatus includes a monitoring system for monitoring progress of the grinding process. A monitoring system has been proposed recently for optically measuring the thickness of a film being ground. This monitoring system measures the current thickness of the film applied to the substrate surface and undergoing the grinding process, by irradiating the substrate surface with measuring light, taking in the measuring light reflected from the substrate surface, measuring the spectrum of the reflected light, and analyzing the spectrum measured of the reflected light.

However, abrasive powder may remain adhering to the substrate surface (or the film being ground) while the film thickness is measured. Such abrasive powder absorbs or scatters the measuring light to make accurate thickness measurement impossible.

Inventors have carried out film thickness measuring experiments aimed at solving the above problem. The measuring system used in the experiments had a measuring window opposed to the surface of a substrate in time of measuring film thickness. Through this window, measuring light was emitted to the surface of the substrate and the light reflected from the substrate surface was taken in. A measurement region between the substrate surface and the measuring window was filled with cleaning liquid (deionized water) to form a liquid curtain therein.

According to the system having the above construction, abrasive powder adhering to the substrate surface was washed away by the liquid curtain formed in the measurement region, to the extent no longer obstructive to the film thickness measurement. This prevented absorption and scattering of the measuring light, offering a prospect for an accurate measurement of the thickness of a film being ground.

However, it has been found that, when the above technique of measuring film thickness by forming a liquid curtain is applied to an actual grinding apparatus, the cleaning liquid could produce bubbles in the measurement region. Such bubbles are detrimental to an accurate measurement of film thickness.

SUMMARY OF THE INVENTION

This invention has been made having regard to the state of the art noted above, and its object is to provide a grinding process monitoring system and grinding process monitoring method which enable an accurate measurement of film thickness by effectively suppressing bubble generation and the like in a measurement region when a liquid curtain is formed to measure film thickness.

Inventors have investigated into the cause of bubbles present in the measurement region when the technique of measuring film thickness by forming a liquid curtain is applied to the actual apparatus. It has been determined that the bubbles are caused by the following factors.

When the grinding process is interrupted to measure film thickness, the surface of the substrate must be separated from the turntable to set the substrate surface and the measuring window of the monitoring system opposite each other. However, the spacing between the measuring window and the substrate surface is not always the same, which is due to a shortcoming in the mechanical precision of a setting mechanism. The spacing between the measuring window and the substrate surface is slightly variable also with progress of the film grinding process. Further, the spacing between the measuring window and the substrate surface is variable with the number of patterned layers formed under the film being ground (i.e. formed between the film being ground and the substrate surface).

Thus, the spacing between the measuring window and the substrate surface in time of measuring film thickness is variable from system to system or from one substrate being ground to another. Such variations are believed responsible for the bubble formation in the measurement region.

When, for example, the spacing between the measuring window and the substrate surface is too large, the measurement region cannot be filled with the cleaning liquid for forming a liquid curtain. Then, bubbles formed outside may enter the measurement region. On the other hand, when the spacing between the measuring window and the substrate surface is too small, the cleaning liquid supplied to form the liquid curtain collides with the substrate surface under increased pressure, thereby generating bubbles in the measurement region.

Inventors have confirmed that the bubble formation and the like in the measurement region are suppressed by appropriately adjusting the spacing between the measuring window and the substrate surface or adjusting the outflow quantity of the cleaning liquid for forming the liquid curtain. It has also been found what characteristic variations are caused in the spectrum of measuring light reflected from the substrate surface by the bubbles present in the measurement region.

Based on such results of their research, Inventors have made the invention set out hereinafter.

In one aspect of the present invention, a grinding process monitoring system is provided for use with a grinding apparatus for measuring thickness of a film applied to a substrate surface, the system comprising:

a spectrum measuring unit having a measuring window opposed to the substrate surface, the spectrum measuring unit emitting measuring light to the substrate surface through the measuring window, receiving reflected light of the measuring light from the substrate surface through the measuring window, and measuring a spectrum of the reflected light;

a film thickness computing unit for determining the thickness of the film by analyzing the spectrum;

a liquid curtain forming unit for filling a measurement region between the measuring window and the substrate surface with a cleaning liquid to form a liquid curtain in the measurement region;

a moving unit for moving the measuring window and the substrate surface toward and away from each other; and a controller for controlling the moving unit, while examining bubble characteristic variations occurring in the spectrum due to bubbles present in the measurement region, to adjust a spacing between the measuring window and the substrate surface by feedback control to eliminate the bubble characteristic variations.

In another aspect of the present invention, a grinding process monitoring method is provided for measuring thickness of a film applied to a substrate surface, the method comprising the steps of:

forming a liquid curtain of a cleaning liquid in a measurement region between the substrate surface and a measuring window opposed thereto;

emitting measuring light to the substrate surface through the measuring window, receiving reflected light from the substrate surface through the measuring window, and obtaining a spectrum of the reflected light;

examining bubble characteristic variations occurring in the spectrum due to bubbles present in the measurement region;

varying a spacing between the measuring window and the substrate surface to eliminate the bubble characteristic variations; and determining the thickness of the film by analyzing the spectrum.

In the above grinding process monitoring method, the thickness of the film may be determined by analyzing the spectrum obtained when the bubble characteristic variations have been eliminated.

According to these system and method, the controller controls the moving unit, while referring to the bubble characteristic variations occurring in the spectrum due to bubbles present in the measurement region, to adjust the spacing between the measuring window and the substrate surface by feedback control to eliminate the bubble characteristic variations. In this way, the bubbles may actually be eliminated regardless of the conditions responsible for formation of the bubbles in the measurement region. The film thickness computing unit analyzes the spectrum measured with the bubbles eliminated from the measurement region, to determine the current thickness of the film undergoing the grinding process. Thus, the film thickness is determined accurately without being affected by the bubbles.

In the above grinding process monitoring system, the controller may adjust the spacing by moving the measuring window and the substrate surface toward and away from each other within a predetermined range of movement.

If the measuring window is moved too close to the substrate surface or too far therefrom, there is little possibility of eliminating the bubbles from the measurement region. It is therefore desirable to determine a range beforehand for moving the measuring window and the substrate surface toward and away from each other to adjust the spacing therebetween, without involving wasteful movements. The measuring window would collide with the substrate surface if the measuring window were moved toward the substrate surface without limitation. The measuring window is prevented from colliding with the substrate surface, by moving the measuring window and the substrate surface toward and away from each other within the predetermined range of movement.

In the above grinding process monitoring system, the controller may adjust the spacing by moving the measuring window and the substrate surface toward and away from each other stepwise by every predetermined amount.

This feature simplifies the operation of the controller to control the moving unit.

The grinding process monitoring system may further comprise a liquid outflow adjusting unit for variably adjusting an outflow quantity of the cleaning liquid from the liquid curtain forming unit. In this case, the controller is operable, while examining the bubble characteristic variations, for controlling the moving unit to adjust the spacing by feedback control, and controlling the liquid outflow adjusting unit to adjust the outflow quantity of the cleaning liquid by feedback control, to eliminate the bubble characteristic variations.

The grinding process monitoring method may further comprise the step of varying an outflow quantity of the cleaning liquid to eliminate the bubble characteristic variations.

According to these system and method, the feedback control by the controller based on bubble characteristic variations is extended to the control of the liquid outflow adjusting unit to adjust the outflow quantity of the cleaning liquid from the liquid curtain forming unit. Consequently, the bubbles may be eliminated from the measurement region more properly and reliably. Whichever of the adjustment by feedback control of the spacing between the measuring window and the substrate surface and the adjustment by feedback control of the outflow quantity of the cleaning liquid from the liquid curtain forming unit may be carried out first or with priority.

In the above grinding process monitoring system, the controller may adjust the outflow quantity of the cleaning liquid by varying the outflow quantity within a predetermined range of quantity adjustment.

If the outflow quantity of the cleaning liquid from the liquid curtain forming unit is increased or decreased to excess, there is little possibility of eliminating the bubbles from the measurement region. It is therefore desirable to determine a range of quantity adjustment beforehand for varying the outflow quantity to eliminate the bubbles effectively. Then, the outflow quantity of the cleaning liquid from the liquid curtain forming unit may be adjusted within this predetermined range, without involving wasteful adjusting operations.

In the grinding process monitoring system, the controller may adjust the outflow quantity of the cleaning liquid by varying the outflow quantity stepwise by every predetermined quantity.

This feature simplifies the operation of the controller to control the liquid outflow adjusting unit.

In the above grinding process monitoring system, the controller may be operable for varying the outflow quantity of the cleaning liquid stepwise by every predetermined quantity within a predetermined range of quantity adjustment, and moving the measuring window and the substrate surface toward and away from each other stepwise by every predetermined amount within a predetermined range of movement, while examining the bubble characteristic variations at each stage of variation in the outflow quantity, to adjust the outflow quantity of the cleaning liquid and the spacing by feed-back control, to eliminate the bubble characteristic variations.

More particularly, the controller may be operable for adjusting the outflow quantity of the cleaning liquid by regarding, as a standard outflow quantity, the outflow quantity of the cleaning liquid supplied from the liquid curtain forming unit in time of starting outflow adjustment, varying the outflow quantity from the standard outflow quantity in one of a direction for increasing the outflow quantity and a direction for decreasing the outflow quantity, and for adjusting the spacing by regarding, as an initial position, a position relative to the substrate surface taken by the measuring window in time of starting spacing adjustment, moving the measuring window from the initial position in one of a direction for moving the measuring window away from the substrate surface and a direction for moving the measuring window toward the substrate surface.

BRIEF DESCRIPTION OF THE DRAWINGS

For the purpose of illustrating the invention, there are shown in the drawings several forms which are presently preferred, it being understood, however, that the invention is not limited to the precise arrangement and instrumentalities shown.

DESCRIPTION OF THE PREFERRED EMBODIMENTS

A preferred embodiment of the present invention will be described in detail hereinafter with reference to the drawings.

Figure 1:
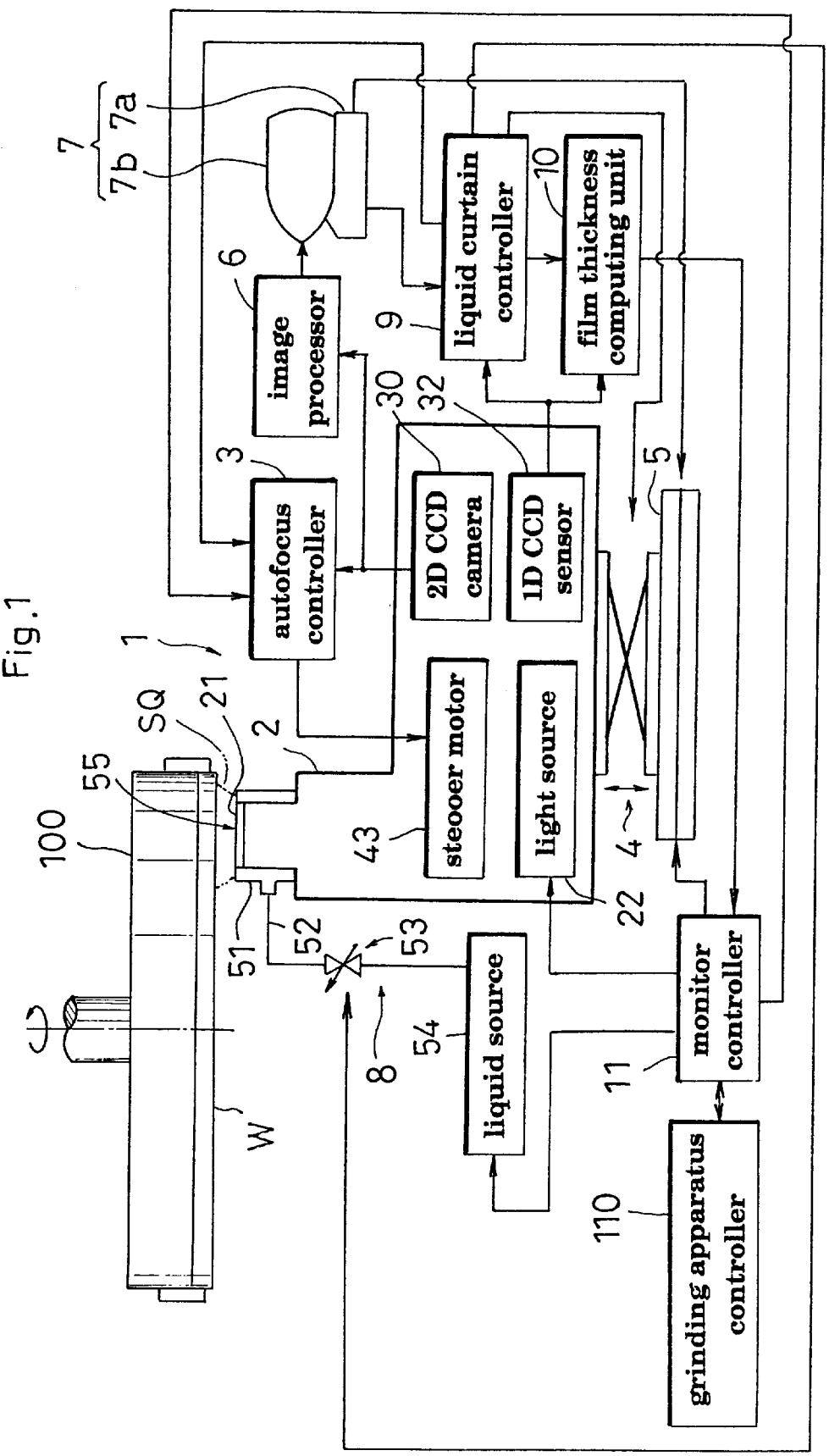
FIG. 1 is an overall view of a grinding process monitoring system according to the present invention.
Figure 2:
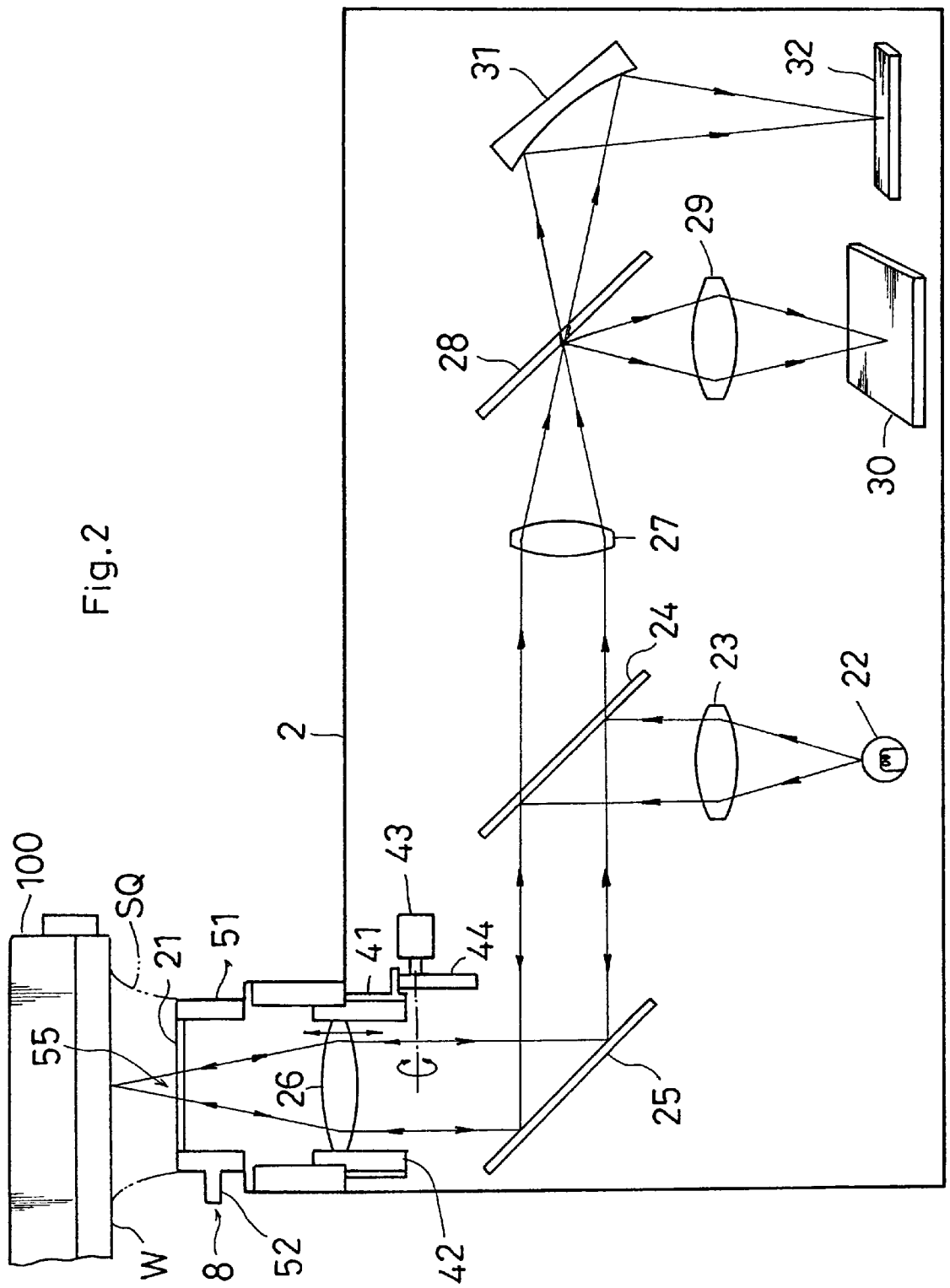
FIG. 2 is a view showing details of a measuring unit.

A grinding process monitoring system embodying the present invention is constructed as shown in FIGS. 1 and 2.

In these figures, a surface of a substrate (semiconductor wafer) W and a measuring window 21 of a measuring unit 2 of grinding process monitoring system 1 are set opposite each other for film thickness measurement.

Figure 3:
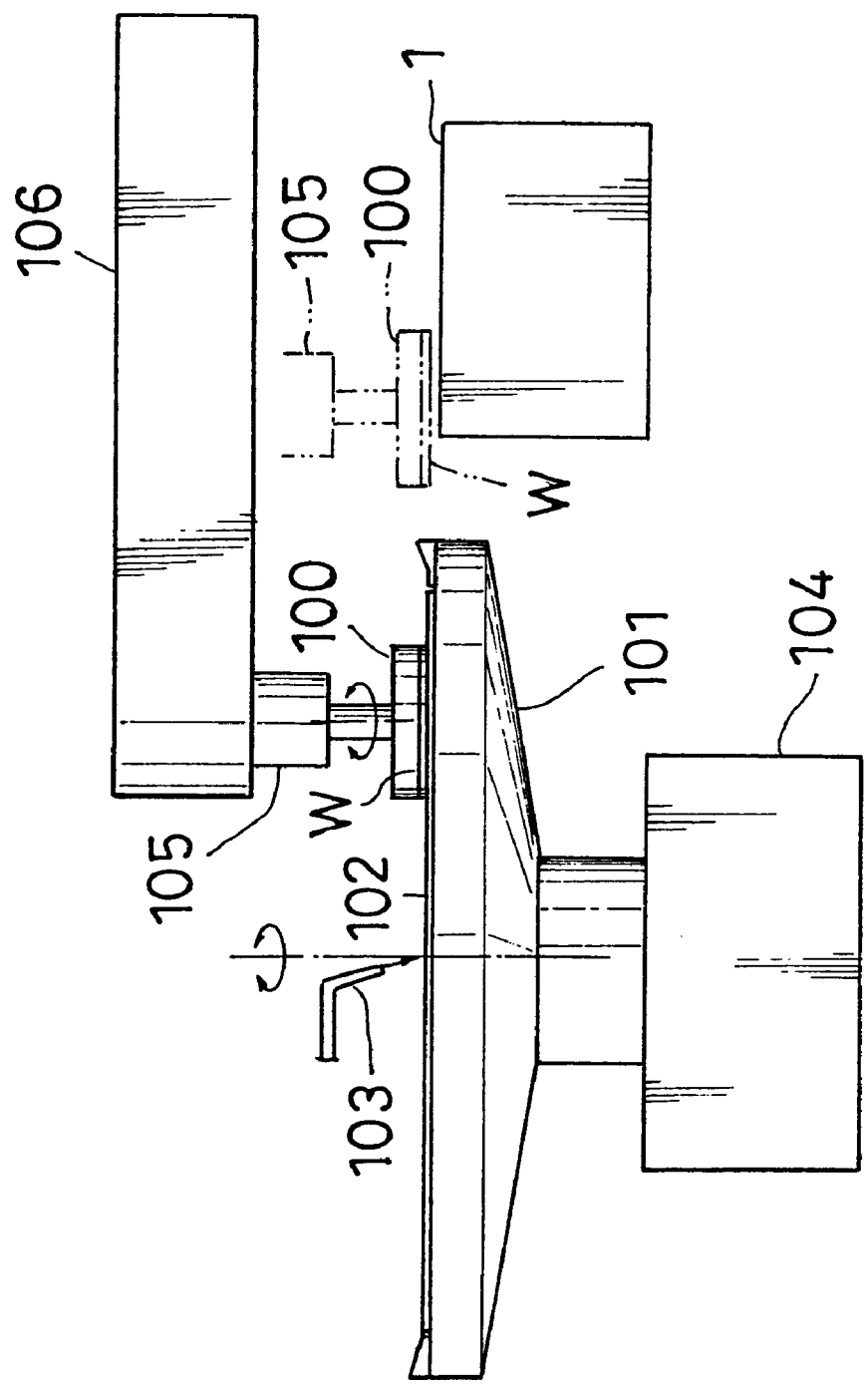
FIG. 3 is a schematic view of a grinding apparatus including the grinding process monitoring system.

The substrate W is supported by a top ring 100, with the surface (i.e. surface coated with a film to be ground) thereof facing down. During a grinding process, as shown in FIG. 3, for example, the top ring 100 presses the downwardly facing surface of substrate W against an abrasive cloth 102 extended over an upper surface of a turntable 101. While a slurry is supplied from a nozzle 103 onto the abrasive cloth 102, the turntable 101 is rotated about a vertical axis by a rotating mechanism 104 including a motor. Independently of the turntable 101, the top ring 100 (substrate W) also is rotated about a vertical axis. Thus, the top ring 100 is constructed rotatable about the vertical axis by a rotating mechanism 105 including a motor and the like. A moving mechanism 106 is provided for moving the top ring 100 from the position for the grinding process to the set position shown in FIGS. 1 and 2 (and vice versa). Consequently, the grinding process and monitoring (film thickness measurement) of progress of the grinding process may be executed alternately.

Figure 4:
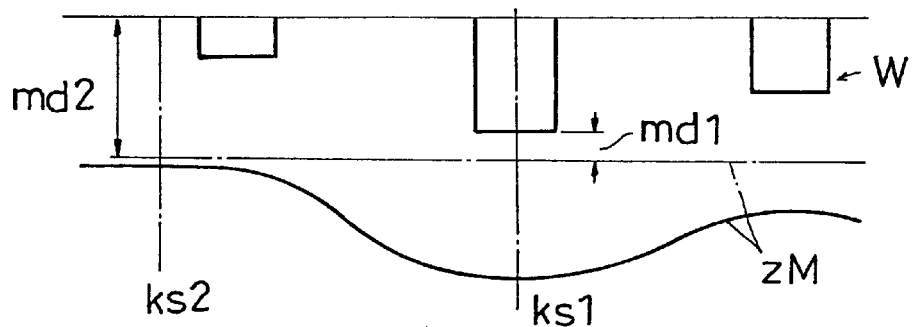
FIG. 4 is an explanatory view illustrating a process of grinding a film formed on a surface of a substrate.

The grinding process for grinding a film (insulating film) applied to the surface of substrate W will be described briefly with reference to FIG. 4.

When forming circuit pattern layers in multiple stages on the surface of substrate W, an insulating film (e.g. SiO2 film) is coated on a lower pattern layer, and then an upper pattern layer is formed on the insulating film. If the lower pattern layer is formed with an uneven surface, the insulating film ZM coated thereon also has an uneven surface as shown in a solid line in FIG. 4. If the upper (microscopic) pattern layer were formed on the uneven surface of insulating film ZM, a circuit pattern of desired linewidth could not be drawn when the microscopic circuit pattern is exposed by a step and repeat machine. To avoid such inconvenience, the insulating film ZM is ground in the above-mentioned grinding process, whereby the insulating film has a smooth surface free of irregularities as shown in a dot-and-dash line in FIG. 4.

The construction of grinding process monitoring system 1 will be described next with reference to FIGS. 1 and 2.

The grinding process monitoring system 1 includes the measuring unit 2 acting as a spectrum measuring device, an autofocus controller 3, a lift mechanism 4 for moving the measuring window 21 toward and away from the substrate W, a horizontal biaxial drive mechanism 5, an image processor 6, a display control unit 7, a liquid curtain forming mechanism 8, a liquid curtain controller 9, a film thickness computing unit 10 and a monitor controller 11.

The measuring unit 2 is constructed as follows.

As shown in FIG. 2, measuring light from a light source 22 passes through an illuminating lens 23. Then, the light is deflected by a half mirror 24 and a mirror 25 to pass through an imaging lens 26 and the measuring window 21 and converge at a predetermined measurement point on the surface of substrate W. The measuring light reflected from the surface of substrate W (i.e. from the measurement point) passes through the measuring window 21 and imaging lens 26, and is deflected by the mirror 25 to pass through the half mirror 24 and an imaging lens 27. The reflected light is then divided by a pinhole mirror 28. One part of the reflected light travels through an imaging lens 29 to a two-dimensional CCD camera 30 for photographing an image of an area around the measurement point on the surface of substrate W. The other part of the reflected light is broken up to a predetermined band of wavelength by a holographic grating 31. The resulting spectrum undergoes a photoelectric conversion at a one-dimensional CCD sensor 32. The light source 22 is turned on and off by the monitor controller 11 (see FIG. 1).

The imaging lens 26 is movable toward and away from the measuring window 21 (or the surface of substrate W). As shown in FIG. 2, the imaging lens 26 is attached at peripheries thereof to guide rods 41 and 42. A lens moving mechanism includes a stepper motor 43 for rotating an eccentric cam 44 to move the guide rod 41 vertically. Thus, the image lens 26 is automatically movable to converge the measuring light at a predetermined measurement point on the surface of substrate W. That is, an autofocus mechanism is provided by this structure. The autofocusing stepper motor 43 is controllable by the autofocus controller 3 (see FIG. 1).

The autofocus controller 3 recognizes, through image processing (image contrast method), blurring of the image photographed by the two-dimensional CCD camera 30, and drives the stepper motor 43 to eliminate the blurring of the image. As a result, the imaging lens 26 is moved toward or away from the surface of substrate W, thereby focusing the measuring light thereon. The autofocus controller 3 performs the measuring light focusing operation upon instructions from the monitor controller 11 and liquid curtain controller 9.

The lift mechanism 4 is in the form of a well-known linear drive mechanism such as a ball screw with a stepper motor acting as a drive source thereof, to raise and lower the measuring unit 2 (vertically in FIG. 1). In this way, the measuring window 21 is movable toward and away from the surface of substrate W. The lift mechanism 4 (or its drive source) is controllable by the liquid curtain controller 9.

The horizontal biaxal drive mechanism 5 is formed of two well-known linear drive mechanisms such as ball screws with stepper motors acting as drive sources thereof, respectively, to move the measuring unit 2 horizontally parallel to the surface of substrate W and along two axes extending perpendicular to each other (sideways in FIG. 1 and in directions perpendicular to the plane of FIG. 1). In this way, the measuring window 21 (or focal point of the measuring light on the surface of substrate W) is movable on the surface of substrate W. The horizontal biaxial drive mechanism 5 is controllable by the operator through a control device 7a of display control unit 7 or by instructions from the monitor controller 11.

Figure 5A:
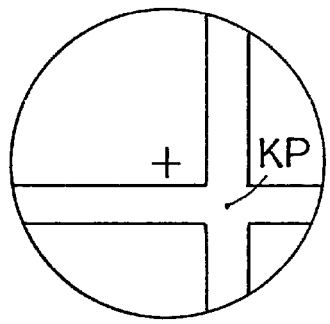
FIG. 5A and 5B are views illustrating a way of registering a focal point of measuring light and a measurement point.
Figure 5B:
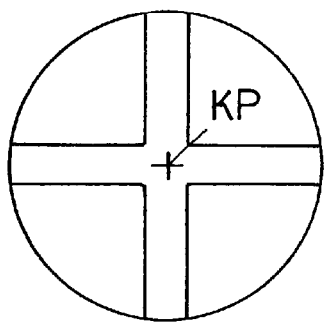

The image processor 6 causes the image photographed by the two-dimensional CCD camera 30 to be displayed on a display 7b of display control unit 7 as shown in FIGS. 5A and 5B. The center of the image displayed on the display 7b (i.e. the intersection of the cross in FIGS. 5A and 5B) corresponds to a current focal point of the measuring light on the surface of substrate W. A measurement point KP for measuring film thickness is determined in advance. In FIG. 5A, the current focal point of the measuring light on the surface of substrate W is displaced from the measurement point KP. In such a case, the operator operates the control device 7a of display control unit 7 to drive the horizontal biaxal drive mechanism 5 to move the measuring unit 2 horizontally along the two axes, so that the current focal point of the measuring light on the surface of substrate W register with the measurement point KP as shown in FIG. 5B. Once the current focal point of the measuring light has been adjusted to the measurement point KP, the operator gives an instruction from the control device 7a to the liquid curtain controller 9 to start adjusting a liquid curtain.

In the foregoing instance, the focal point of the measuring light is adjusted to the measurement point by the operator through the control device 7a. Alternatively, this operation may be carried out automatically. In this case, information on the measurement point is inputted to the image processor 6 in advance. The image processor 6, through image processing, recognizes a displacement from the measurement point of the current focal point of the measuring light. The monitor controller 11 drives the horizontal biaxial drive mechanism 5 to cancel the displacement. Once the current focal point of the measuring light has been adjusted to the measurement point KP, the monitor controller 11 gives an instruction to the liquid curtain controller 9 to start adjusting the liquid curtain.

To monitor progress of the grinding process (i.e. to measure film thickness), the grinding process is interrupted, the surface of substrate W is separated from the grinding cloth 102 on the turntable 101, and the surface of substrate W and the measuring window 21 are set opposite each other. However, the measuring window 21 may not be set opposite the measurement point. It may therefore be necessary to adjust the position of measuring window 21 to the surface of substrate W so that the measurement point be included in the image photographed by the two-dimensional CCD camera 30. This positional adjustment is done by driving the horizontal biaxial drive mechanism 5 if the measuring window 21 is movable by the horizontal biaxial drive mechanism 5 over a range covering the entire surface of substrate W. On the other hand, if the range of movement of the measuring window 21 covers only part of the surface of substrate W, the above positional adjustment relies on a combination of rotation about the vertical axis of the top ring 100 and operation of the horizontal biaxial drive mechanism 5. Once the measurement point is included in the image photographed by the two-dimensional CCD camera 30 through the positional adjustment of the measuring window 21 relative to the measurement point, an accurate positioning of the focal point of the measuring light and the measurement point is carried out, as described above, based on the image obtained.

A plurality of measurement points may be designated. In this case, after the film thickness measurement is completed for one measurement point, the position of measuring window 21 is adjusted to a next measurement point. When the next measurement point is included in the image photographed by the two-dimensional CCD camera 30, an accurate positioning of the focal point of the measuring light and the measurement point is repeated based on this image.

The liquid curtain forming mechanism 8 includes a liquid outflow section 51, a liquid supply pipe 52, a flow control valve 53 acting as an outflow quantity adjusting device, and a liquid source 54. The liquid outflow section 51 has an inner wall thereof defined by a wall adjacent the measuring window 21 of the measuring unit 2, and an outer wall disposed around the inner wall. The inner wall and outer wall define a space therebetween which is closed at a lower end and open at an upper end. This space communicates with one end of the liquid supply pipe 52, the other end of which is connected to the liquid source 54. A cleaning liquid (deionized water) is supplied from the liquid source 54 through the liquid supply pipe 52 to the space in the liquid outflow section 51. As shown in two-dot-and-dash lines in FIGS. 1 and 2, deionized water SQ flows out of the upper end of this space toward the surface of substrate W. Consequently, the deionized water SQ fills a measurement region 55 between the measuring window 21 and the surface of substrate W to form a liquid curtain in the measurement region 55. The film thickness measurement is carried out, as described hereinafter, with the liquid curtain formed in this way (i.e. the measurement region 55 being filled with deionized water SQ). With formation of the liquid curtain, abrasive powder adhering to a region including the measurement point on the surface of substrate W is washed away to the extent of presenting no obstruction to the film thickness measurement. This eliminates the inconvenience of the measuring light being absorbed or scattered by the abrasive powder. However, the cleaning liquid could produce bubbles in the measurement region 55 to hamper the film thickness measurement. To avoid such a situation, according to this invention, the liquid curtain controller 9 is operable to adjust the liquid curtain to suppress bubbles as described hereinafter.

In this embodiment, the flow control valve 53 is provided to adjust the quantity of liquid transmitted through the liquid supply pipe 52, thereby adjusting the quantity of liquid flowing out of the outflow section 51 as desired. The flow control valve 53 is operable under control of the liquid curtain controller 9. The liquid curtain formation itself, i.e. supplying and stopping of deionized water from the liquid source 54, is controlled by the monitor controller 11.

Upon receipt of an instruction to start a liquid curtain adjustment, the liquid curtain controller 9 takes in the spectrum of light reflected from the measurement point, having undergone a photoelectric conversion at the one-dimensional CCD sensor 32 and converted into digital data by an A/D (analog-to-digital) converter not shown. The liquid curtain controller 9 checks the date to determine if bubbles are present in the measurement region 55. To eliminate bubbles from the measurement region 55, if any, the liquid curtain is adjusted by vertically moving the measurement window 21 (by driving the lift mechanism 4) and/or adjusting the outflow quantity of deionized water from the outflow section 51 (by operating the flow control valve 53). When the liquid curtain has been adjusted to eliminate the bubbles from the measurement region 55, the liquid curtain controller 9 gives an instruction to the film thickness computing unit 10 to start measuring film thickness.

Figure 6A:
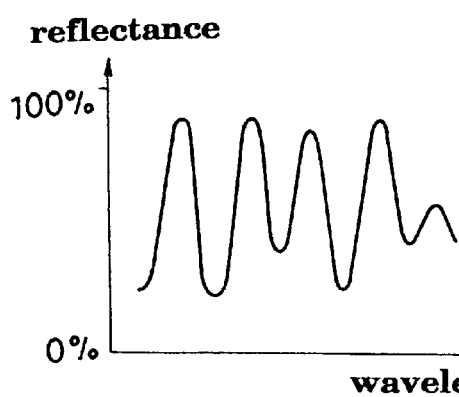
FIGS. 6A and 6B are graphs showing spectra of reflected light in the presence and absence of bubbles.
Figure 6B:
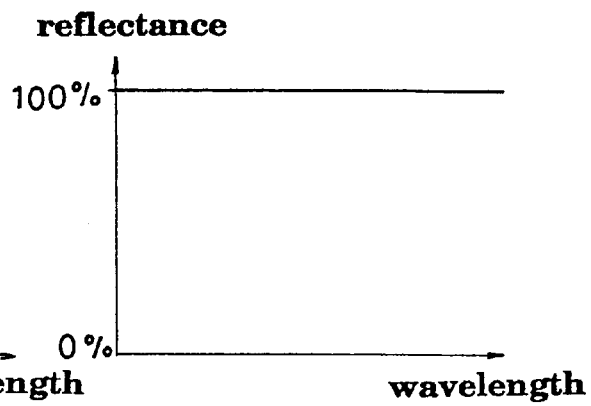

As shown in FIG. 6A, the spectrum of light reflected from the measurement point in the absence of bubbles from the measurement region 55 has reflectance variations from wavelength to wavelength. On the other hand, as shown in FIG. 6B, the spectrum of light reflected from the measurement point in the presence of bubbles in the measurement region 55 has reflectance at 100% or 0% for all wavelengths, with no reflectance variations from wavelength to wavelength. Thus, presence or absence of bubbles in/from the measurement region 55 may be determined based on whether variations appear for the respective wavelengths in the spectrum of light reflected from the measurement point.

Upon receipt of the film thickness measurement start instruction, the film thickness computing unit 10 takes in the spectrum of light reflected from the measurement point, having undergone a photoelectric conversion at the one-dimensional CCD sensor 32 and converted into digital data by the A/D converter not shown. The film thickness computing unit 10 analyzes the data taken in to determine the thickness of the film at the measurement point undergoing the grinding process.

As noted above, the spectrum of light reflected from the measurement point with no bubbles present in the measurement region 55 exhibits the variations shown in FIG. 6A. The way in which the reflectance variations appear for the respective wavelengths in this spectrum is dependent upon the material of film being ground, and a combination of the film material and the material of the underlying pattern layer and so on (this combination being hereinafter called material characteristics). Furthermore, even where the material characteristics remain unchanged, the reflectance variations appear for the respective wavelengths in this spectrum in different ways if the film being ground has different thicknesses.

The film thickness computing unit 10 stores spectral samples of different thicknesses of the film being ground, for each material characteristic. The material characteristic at the measurement point on the surface of substrate W currently measured is known. Thus, the film thickness computing unit 10 can determine a current thickness of the film being ground, by finding a spectral sample coinciding with the reflectance variations of the respective wavelengths in the spectrum currently analyzed, among the spectral samples of different thicknesses of the film being ground and having the material characteristic at the measurement point on the surface of substrate W currently measured. The film thickness derived is applied to the monitor controller 11.

The monitor controller 11 is operable upon a monitoring start instruction from a grinding apparatus controller 110, to control the respective components of the monitoring system 1 as described hereinafter. The thickness of the film being ground is thereby measured at a predetermined measurement point or points, and the film thickness measured is applied to the grinding apparatus controller 110. The information on the measurement point or points is supplied by the grinding apparatus controller 110.

The grinding apparatus controller 110 controls the entire grinding apparatus, e.g. controls the grinding process, interrupts the grinding process, separates the surface of substrate W from the abrasive cloth 102 on the turntable 101, and sets the surface of substrate W opposite the measuring window 21. The grinding apparatus controller 110 gives a monitoring start instruction to the monitor controller 11 after setting the surface of substrate W opposite the measuring window 21 (to the position shown in FIGS. 1 and 2). Upon receipt of the film thickness measured from the monitor controller 11, the apparatus controller 110 checks, based on this information, whether the film being processed has been ground smooth and to a target thickness. If the film has been ground smooth and to the target thickness, the grinding process is terminated for the substrate W. Otherwise, the grinding process is resumed for that substrate W, and monitoring of progress of the grinding process (i.e. film thickness measurement by the monitoring system 1) is repeated.

Only one measurement point may be designated if it is guaranteed that the grinding process is effected uniformly, i.e. if the film is ground to be flat and smooth throughout. In FIG. 4, for example, film thickness may be measured at a single measurement point ks1 designated. It is then checked whether the film thickness measured has been ground to a predetermined target film thickness md1 for the measurement point ks1. If the film thickness measured equals the target film thickness md1, the film has been ground flat throughout. The grinding process is terminated for that substrate W since the film has been ground flat and to the target thickness. If the film thickness measured is found greater than the target film thickness md1, the grinding process is resumed for the substrate W.

To determine from the film thickness measured by the monitoring system 1 whether the film has been ground flat or not and whether the film has been ground to a target film thickness or not, a plurality of measurement points may, for example, be designated as distributed over the surface of substrate W. This aspect will be described by taking measurement points ks1 and ks2 in FIG. 4, for example. It is checked whether film thicknesses at the measurement points ks1 and ks2 measured by the monitoring system 1 have reached predetermined target film thicknesses md1 and md2 for the measurement points ks1 and ks2. The target film thicknesses md1 and md2 are predetermined for the measurement points ks1 and ks2 so that the film be ground flat. If the film thicknesses at the measurement points ks1 and ks2 measured by the monitoring system 1 have reached the predetermined target film thicknesses md1 and md2 for the measurement points ks1 and ks2, it means that the film has been ground flat and to a target film thickness at least around the two measurement points ks1 and ks2. Thus, by designating a plurality of measurement points as distributed over the surface of substrate W, it may be determined that the film has been ground flat and to a target film thickness.

Next, an operation of the monitoring system 1 for monitoring the grinding process will be described with reference to the flowchart shown in FIG. 7.

Upon receipt of a monitoring start instruction from the grinding apparatus controller 110, the monitor controller 11 carries out a positional adjustment of the measuring window 21 and the surface of substrate W to set the measuring window 21 opposite a first measurement point (step S1).

Subsequently, the monitor controller 11 controls the liquid source 54 to film the measurement region 55 with deionized water for forming a liquid curtain (step S2). The monitor controller 11 then turns on the light source 22 (step S3), and causes the autofocus controller 3 to focus the measuring light (autofocusing) (step S4). Here, checking may be made whether the autofocusing is completed within a predetermined time or not. If the autofocusing is not completed within the predetermined time, the operation may be terminated after giving an alarm to the operator to the effect that autofocusing is impossible.

Based on the image photographed by the two-dimensional CCD camera 30, an accurate positioning is carried out of the focal point of the measuring light and the current measurement point (step S5). After this positioning is completed, an instruction is given to the liquid curtain controller 9 to start adjusting the liquid curtain.

Then, the liquid curtain controller 9 executes a liquid curtain adjusting process (step S6). Details of this process will be described hereinafter.

Step S7 is executed to check if the liquid curtain adjusting process has been completed normally, i.e. if the liquid curtain has been adjusted in a way to eliminate bubbles from the measurement region 55. If the process is completed normally, a film thickness measurement start instruction is given to the film thickness computing unit 10, and the operation proceeds to step S9. On the other hand, when the liquid curtain adjusting process is terminated abnormally (i.e. when the liquid curtain adjustment has failed to eliminate bubbles from the measurement region 55), an abnormality processing is executed to give an alarm notifying the failure to the operator (step S8). The monitoring operation is terminated after returning an abnormal termination notice to the grinding apparatus controller 110. In response to the abnormal termination notice, the grinding apparatus controller 110 keeps the grinding apparatus on standby until, for example, the operator completes an appropriate remedial operation.

The film thickness computing unit 10, having received the film thickness measurement start instruction, takes in the spectrum of light reflected from the current measurement point, derives therefrom a film thickness at that measurement point, and gives the film thickness derived to the monitor controller 11 (step S9). The monitor controller 11 stores this film thickness as related to the measurement point.

Then, the monitor controller 11 turns off the light source 22 (step S10), and stops the supply of deionized water from the liquid source 54 to stop formation of the liquid curtain (step S11).

Next, the monitor controller 11 checks whether film thickness has been measured at all measurement points designated. If a measurement point remains to be processed for film thickness measurement, the operation returns to step S1 to measure the film thickness at the remaining measurement point. If film thickness measurement has been completed for all the measurement points, the monitor controller 11 returns the film thickness at each measurement point to the grinding apparatus controller 110, and ends the monitoring operation (step S12).

The grinding apparatus controller 110, having received information on the film thicknesses measured at the designated measurement points, determines from this information whether the grinding process should be continued or discontinued for the substrate W.

In the above flowchart, the light source 22 is turned on and off for the film thickness measurement for each measurement point. Alternatively, the light source 22 may be turned on at the beginning of the monitoring operation, kept on throughout the monitoring operation, and turned off only when film thickness measurement is completed for all the measurement points.

In the above flowchart, after the liquid curtain is formed (step S2), the light source 22 is turned on (step S3), the measuring light is focused (step S4) and the focal point of the measuring light and the measurement point are positionally adjusted (step S5). Instead, the liquid curtain may be formed (step S2) after the light source 22 is turned on (step S3), the measuring light is focused (step S4) and the focal point of the measuring light and the measurement point are positionally adjusted (step S5).

In the above embodiment, the grinding apparatus controller 110 determines, based on the film thicknesses measured at the designated measurement points, whether the grinding process should be continued or discontinued for the substrate W. For example, this decision may be made by the monitoring system 1. That is, a target film thickness for each measurement point is inputted to the monitor controller 11 in advance. Based on the film thicknesses measured at the designated measurement points and the target film thicknesses for these measurement points, the monitor controller 11 determines whether the grinding process should be continued or discontinued for the substrate W. Only the result of this determination is transmitted to the grinding apparatus controller 110.

Figure 8:
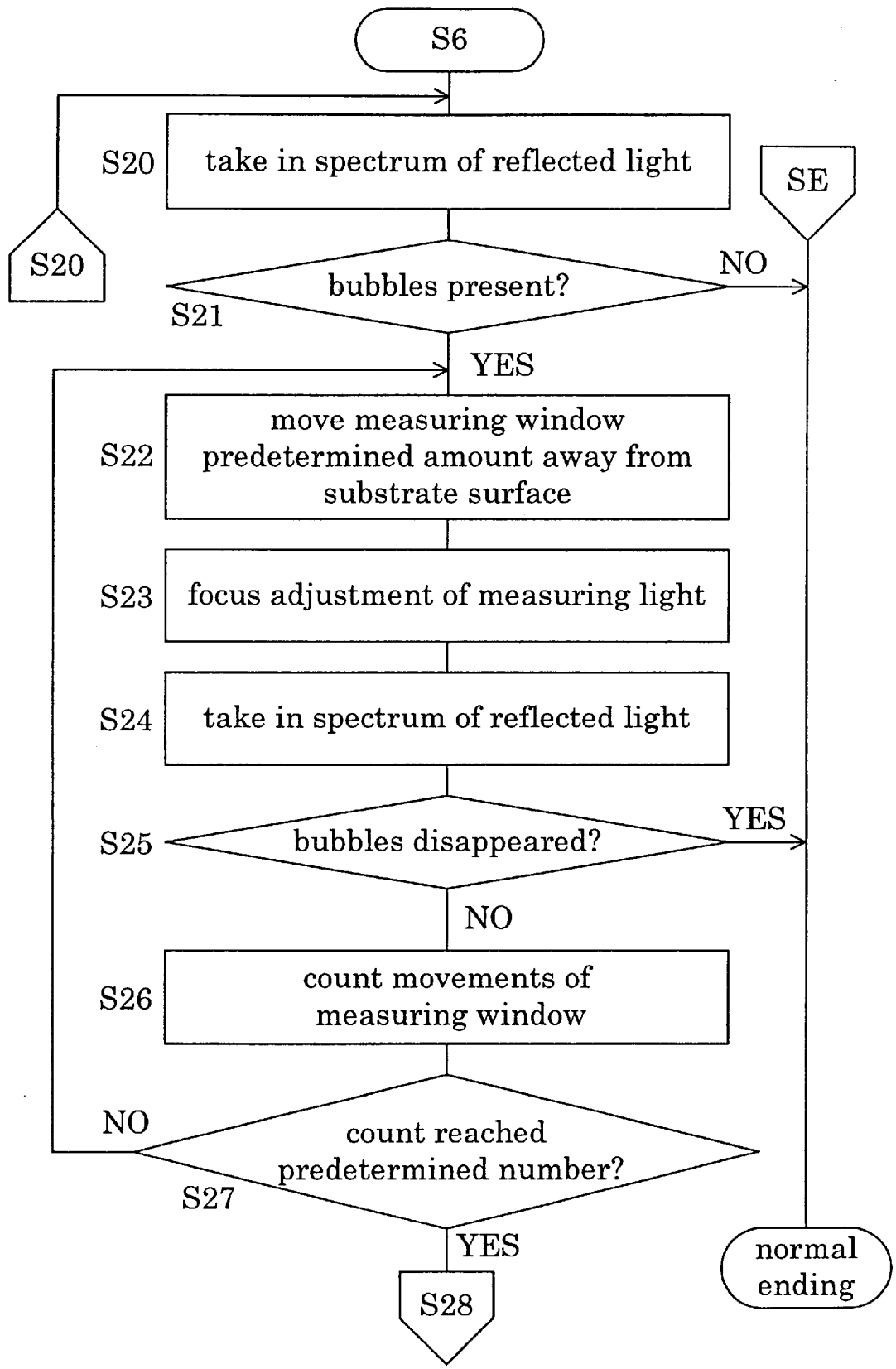
FIGS. 8, 9 and 10 are flowcharts of a process executed by a liquid curtain controller in adjusting a liquid curtain.

Next, the liquid curtain adjusting process executed by the liquid curtain controller 9 will be described with reference to the flowcharts shown in FIGS. 8 through 10.

Figure 7:
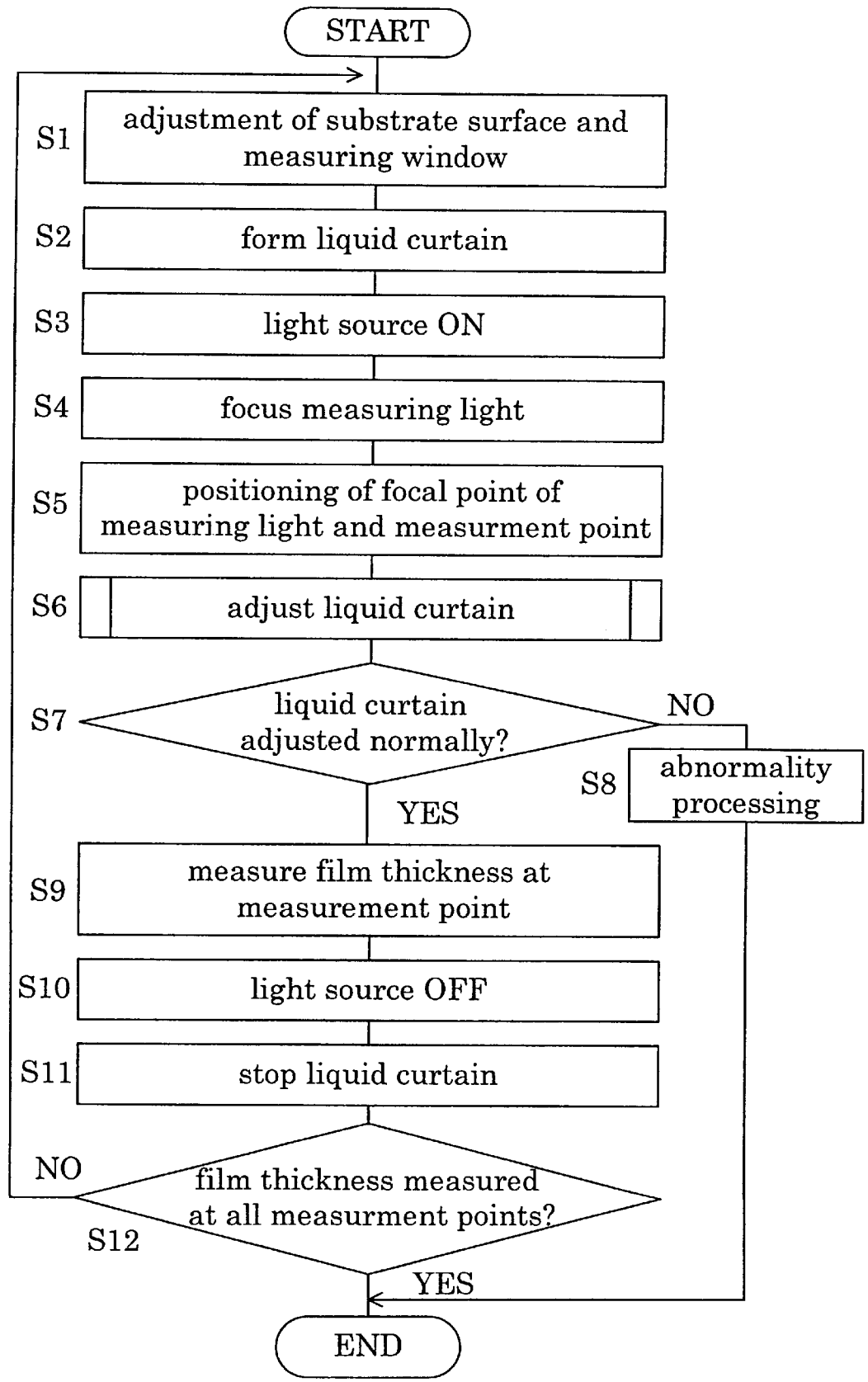
FIG. 7 is a flowchart of a process executed by the monitoring system in monitoring a grinding process.

At step S2 in FIG. 7, the flow control valve 53 is adjusted to form the liquid curtain with deionized water flowing in a predetermined standard quantity from the outflow section 51. The flow rate through the flow control valve 53 occurring at this time is called herein the standard flow rate. Thus, the flow control valve 53 is adjusted to the standard flow rate at the stage of starting the liquid curtain adjusting process.

The position of measuring window 21 relative to the surface of substrate W at the stage of starting the liquid curtain adjusting process is hereinafter called the initial position.

FIG. 8 refers.

Firstly, the liquid curtain controller 9 takes in the spectrum of light reflected from the measurement point (step S20), and determines with the method illustrated in FIGS. 6A and 6B whether bubbles are present in the measurement region 55 (step S21). The adjusting process is ended normally if the measurement region 55 is free from bubbles. If bubbles are found in the measurement region 55, the measuring window 21 is moved gradually away from the surface of substrate W by way of adjustment to eliminate the bubbles (steps S22–S27).

At step S22, the lift mechanism 4 is driven to lower the measuring unit 2 by a predetermined amount MD. Consequently, the measuring window 21 is moved away from the surface of substrate W just by the amount MD.

Since the entire measuring unit 2 is lowered at step S22, the imaging lens 26 also moves away from the surface of substrate W. As a result, the measuring light becomes no longer focused. Then, the liquid curtain controller 9 causes the autofocus controller 3 to focus the measuring light (step S23). At this time, the measuring light is focused again by moving the imaging lens 26 toward the surface of substrate W just by the amount MD. Therefore, the autofocus controller 3 has only to drive the stepper motor 43 to move the imaging lens 26 toward the surface of substrate W by the amount MD.

As at steps S20 and S21 above, the liquid curtain controller 9 takes in the spectrum of light reflected from the measurement point, and determines whether the bubbles have disappeared from the measurement region 55 (steps S24 and S25). If the bubbles have disappeared from the measurement region 55, the adjusting process comes to a normal end. If the bubbles remain in the measurement region 55, the number of times the measuring window 21 has been moved (i.e. the number of times steps S22–S26 have been executed) is counted (step S26). Then, step S27 is executed to determine whether the count has reached a specified number of times MLD. If the count is smaller than the specified number of times MLD, the operation returns to step S22 to repeat steps S22–S26. If the measuring window 21 has been moved the specified number of times MLD, the operation proceeds to step S28 in FIG. 9.

That is, steps S22–S27 are executed to adjust the liquid curtain by moving the measurement window 21 away from the surface of substrate W stepwise by amount MD, i.e. by lowering the measurement window 21 stepwise by amount MD from the initial position. Whether the bubbles have disappeared from the measurement region 55 or not is checked at each stage (i.e. at the stages where the measuring window 21 is lowered from the initial position by just the amount MD, by amount MD×2, . . . and by amount MD×MLD). The liquid curtain adjusting process is ended at the stage where the bubbles have disappeared from the measurement region 55.

The amount MD×MLD is provided as a limit to the movement of measuring window 21 away from the surface of substrate W. The reason is that, if the measuring window 21 is moved too far from the surface of substrate W, there is little possibility of eliminating the bubbles from the measurement region 55.

Figure 9:
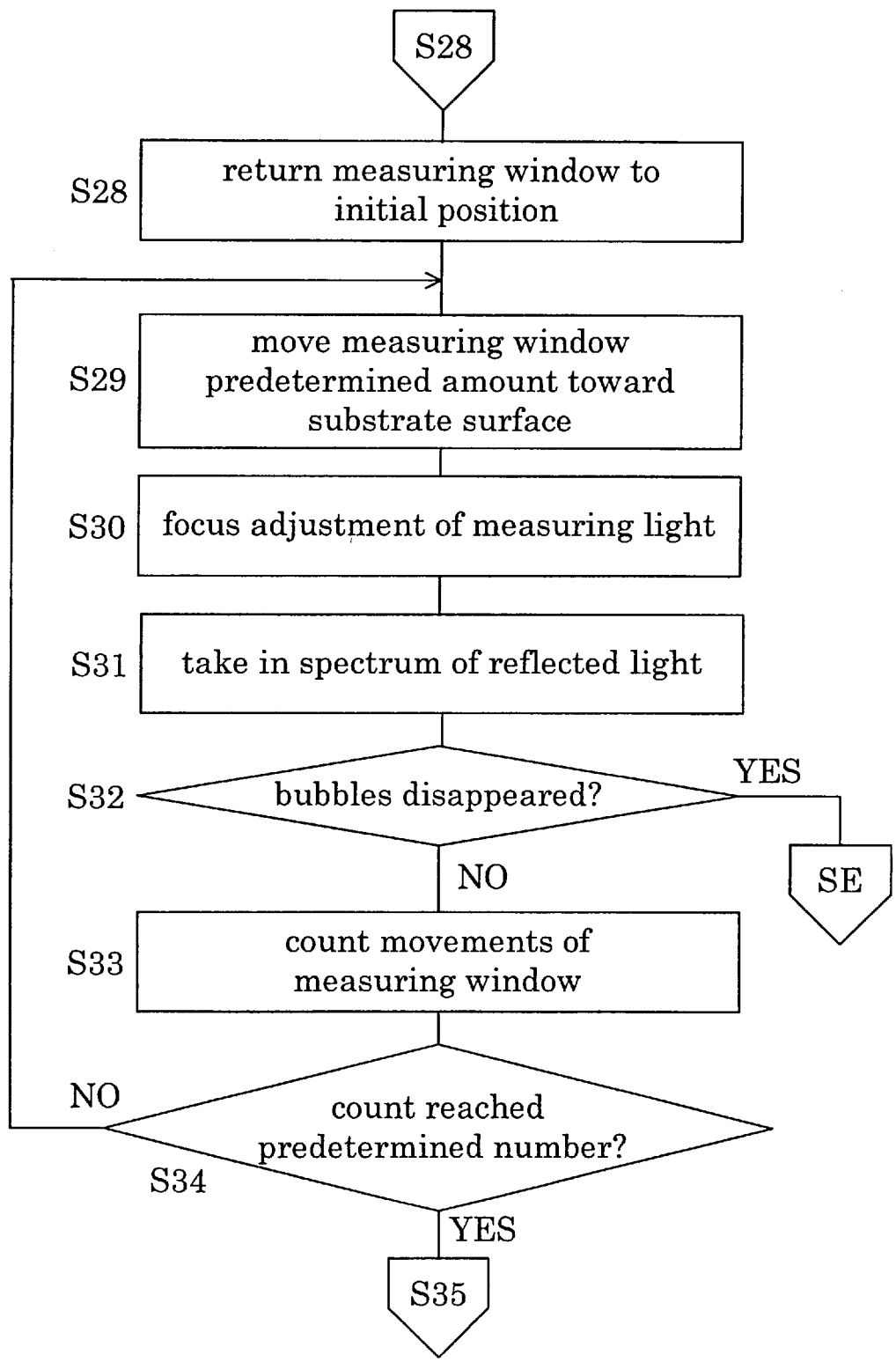

At step S28 in FIG. 9, the measuring window 21 is returned to the initial position. Before step S28, the measuring window 21 has been lowered by amount MD×MLD from the initial position. Thus, at step S28, the lift mechanism 4 is driven to raise the measuring window 21 by amount MD×MLD.

Next, at steps S29–S34, a bubble eliminating adjustment is done by moving the measurement window 21 gradually toward the surface of substrate W, in the opposite direction to the adjustment executed at steps S21–S27. That is, the liquid curtain is adjusted while moving the measurement window 21 toward the surface of substrate W stepwise by a predetermined amount MU, i.e. by raising the measurement window 21 stepwise by amount MU from the initial position. Whether the bubbles have disappeared from the measurement region 55 or not is checked at each stage (i.e. at the stages where the measuring window 21 is raised from the initial position just by the amount MU, by amount MU×2, . . . and by amount MU×MLU). The liquid curtain adjusting process is ended at the stage where the bubbles have disappeared from the measurement region 55. The amount MLU is a predetermined, specified number of times providing a limit to the number of times steps S29–S33 are repeated.

Steps S29–S34 will not particularly be described since these steps are the same as steps S22–S27 excepting that the measurement window 21 is now moved gradually toward the surface of substrate W (i.e. the measurement window 21 is raised gradually from the initial position) to adjust the liquid curtain. At step S30, the autofocus controller 3 drives the stepper motor 43 to move the imaging lens 26 away from the surface of substrate W by amount MU.

The amount MU×MLU is provided as a limit to the movement of measuring window 21 toward the surface of substrate W. The reason is that, if the measuring window 21 is moved too close to the surface of substrate W, there is little possibility of eliminating the bubbles from the measurement region 55. It is also necessary to prevent the measuring window 21 from colliding with the surface of substrate W.

The amount MD by which the measuring window 21 is moved at a time at steps S22–S27 and the amount MU by which the measuring window 21 is moved at a time at steps S29–S34 may be the same or may be different. The specified number of times MLD used at steps S22–S27 and the specified number of times MLD used at steps S29–S34 may be the same or may be different.

At steps S22–S34, the liquid curtain is adjusted by gradually moving the measuring window 21 toward or away from the surface of substrate W within a predetermined range. If such movement of the measuring window 21 alone fails to eliminate the bubbles from the measurement region 55, the liquid curtain is adjusted by adjusting the quantity of liquid outflow also.

Figure 10:
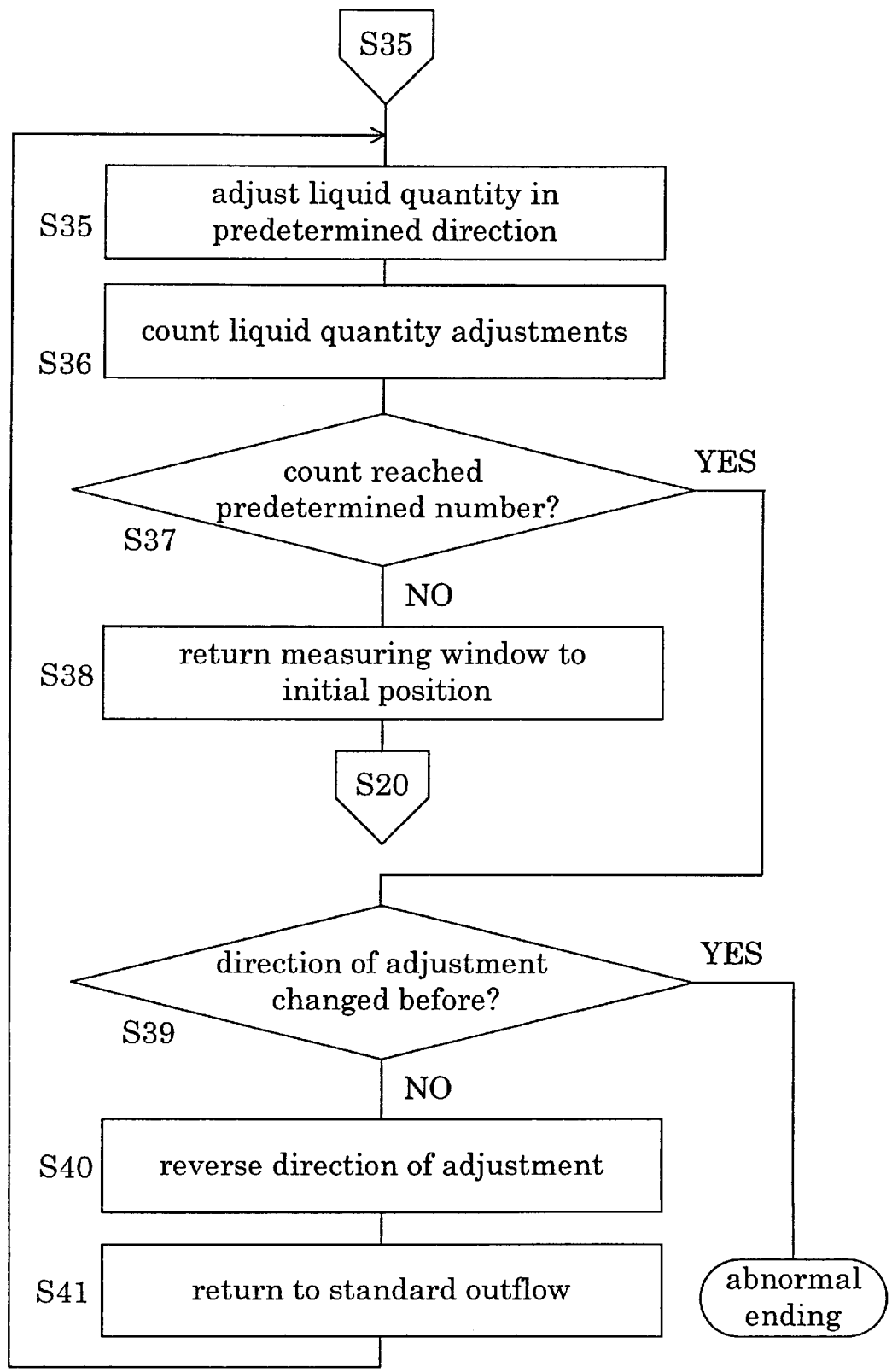

If the checking made at step S34 results in YES, the operation proceeds to step S35 in FIG. 10. Step S35 is executed to adjust the flow control valve 53 to vary the quantity of liquid outflow from the outflow section 51 by a predetermined quantity RR in a currently set direction of liquid quantity adjustment (to increase or decrease the quantity of outflow from the outflow section 51).

The direction of liquid quantity adjustment is set to an initial value. The outflow quantity is first varied in the direction of liquid quantity adjustment set to the initial value. When the outflow quantity varied in that direction reaches a limit value, the direction of liquid quantity adjustment is set opposite to the initial value at step S40. Then, the outflow quantity is varied in that opposite direction.

At step S36, the number of times the outflow quantity has been varied in the current direction of liquid quantity adjustment (i.e. the number of times step S35 has been executed) is counted. Then, step S37 is executed to determine whether the count has reached a specified number of times RL. Thus, steps S36 and S37 determine whether the outflow quantity varied in the current direction of liquid quantity adjustment has reached the limit value (i.e. whether or not the outflow quantity has been increased or decreased by quantity RR×RL from the standard quantity).

If the outflow quantity has not been varied to the limit value in the current direction of liquid quantity adjustment, the measuring window 21 is returned to the initial position (step S38). By the time step S38 is executed, the measuring window 21 has been raised, through steps S29–S34, by amount MU×MLU from the initial position. Thus, at step S38, the lift mechanism 4 is driven to lower the measuring window 21 by amount MU×MLU.

Then, steps S20–S34 are executed with the current liquid outflow quantity. Subsequently, steps S20–S34 are repeated by varying the outflow quantity gradually (in stages). Steps S20–S34 are executed with each varied outflow quantity. When the bubbles disappear from the measurement region 55, the liquid curtain adjusting process is ended normally (steps S21, S25 and S32).

When the outflow quantity varied in the initially set direction of liquid quantity adjustment reaches the limit value, the checking made at step S37 results in YES, and the operation proceeds to step S39. At this stage, the outflow quantity has not yet been varied in the opposite direction to the initially set direction of liquid quantity adjustment. Consequently, the checking made at step S39 results in NO, and the operation proceeds to step S40. The direction of liquid quantity adjustment is set opposite to the initial value (step S40). The flow control valve 53 is returned to the standard flow rate, thereby returning the liquid outflow from the outflow section 51 to the standard quantity (step S41). Steps S20–S34 are repeated by varying the outflow quantity gradually (in stages) in the opposite direction of liquid quantity adjustment. Steps S20–S34 are executed with each varied outflow quantity. If the bubbles do not disappear from the measurement region 55 even when the outflow quantity is increased and decreased to the respective limits across the standard quantity, the checking made at step S39 results in YES, and the liquid curtain adjusting process is terminated abnormally as failing to eliminate the bubbles from the measurement region 55.

In the above flowchart, the quantity of liquid outflow from the outflow section 51 is adjusted within a predetermined range. The reason is that, if the quantity of liquid outflow from the outflow section 51 is increased or decreased to excess, there is little possibility of eliminating the bubbles from the measurement region 55.

In the above liquid curtain adjusting process by the liquid curtain controller 9, the measuring window 21 is moved first from the initial position, away from the surface of substrate W (steps S22–S27), and then from the initial position toward the surface of substrate W (step S29–S34). Instead, the measuring window 21 may be moved first from the initial position toward the surface of substrate W (step S29–S34), and then from the initial position away from the surface of substrate W (steps S22–S27).

In the above liquid curtain adjusting process by the liquid curtain controller 9, a focus adjustment of the measuring light is carried out each time the measuring window 21 is moved toward or away from the surface of substrate W (step S23 or S30). A slight deviation in focusing the measuring light will not affect detection of bubbles. Thus, steps S23 and S30 may be omitted and the measuring light may be focused before a normal ending of the adjusting process. In time of normal ending, the direction (toward or away from the substrate) and amount in which the measuring window 21 has been moved from the initial position are known. Based on the information on the movement of the measuring window 21, the imaging lens 26 may be moved toward or away from the surface of substrate W. If, for example, the measuring window 21 has been moved by amount MD×i (i being a natural number between 1 and MLD) from the initial position and away from the surface of substrate W before the normal ending, the imaging lens 26 may be moved toward the surface of substrate W just by the amount MD×i. If the measuring window 21 has been moved by amount MU×j (being a natural number between 1 and MLT) from the initial position toward the surface of substrate W before the normal ending, the imaging lens 26 may be moved away from the surface of substrate W just by the amount MU×j.

In the above liquid curtain adjusting process by the liquid curtain controller 9, the movement of measuring window 21 toward or away from the surface of substrate W and the adjustment of liquid outflow quantity are combined to adjust the liquid curtain for eliminating bubbles from the measurement region 55. However, the liquid curtain may be adjusted only by the movement of measuring window 21. If necessary, the liquid curtain may be adjusted only by adjusting the liquid outflow quantity (while gradually varying the liquid outflow quantity).

In the foregoing embodiment, after the bubbles are eliminated from the measurement region 55 through the liquid curtain adjusting process by the liquid curtain controller 9, the film thickness computing unit 10 takes in the spectrum of light reflected from the measurement point again. In the course of liquid curtain adjustment by the liquid curtain controller 9, the spectrum of light taken in at step S20, S24 or S31 may be used for measuring film thickness if step S21, S25 or S32 shows no bubbles reflected therein. Thus, the liquid curtain controller 9 may apply to the film thickness computing unit 10 the spectrum of light reflected from the measurement point and taken in at step S20, S24 or S31 if the spectrum is determined to reflect no bubbles during the liquid curtain adjusting process. Then, the film thickness computing unit 10 may derive a film thickness at that measurement point from the spectrum of reflected light received from the liquid the curtain controller 9.

The present invention may be embodied in other specific forms without departing from the spirit or essential attributes thereof and, accordingly, reference should be made to the appended claims, rather than to the foregoing specification, as indicating the scope of the invention.

What is claimed is:

1. A grinding process monitoring system for use with a grinding apparatus for measuring thickness of a film applied to a substrate surface, said system comprising:

spectrum measuring means having a measuring window opposed to said substrate surface, said spectrum measuring means emitting measuring light to said substrate surface through said measuring window, receiving reflected light of said measuring light from said substrate surface through said measuring window, and measuring a spectrum of said reflected light;

film thickness computing means for determining said thickness of said film by analyzing said spectrum;

liquid curtain forming means for filling a measurement region between said measuring window and said substrate surface with a cleaning liquid to form a liquid curtain in said measurement region;

moving means for moving said measuring window and said substrate surface toward and away from each other; and control means for controlling said moving means, while examining bubble characteristic variations occurring in said spectrum due to bubbles present in said measurement region, to adjust a spacing between said measuring window and said substrate surface by feedback control to eliminate said bubble characteristic variations.

2. A grinding process monitoring system as defined in claim 1, further comprising liquid outflow adjusting means for variably adjusting an outflow quantity of said cleaning liquid from said liquid curtain forming means, wherein said control means is operable, while examining said bubble characteristic variations, for controlling said moving means to adjust said spacing by feedback control, and controlling said liquid outflow adjusting means to adjust said outflow quantity of said cleaning liquid by feedback control, to eliminate said bubble characteristic variations.

3. A grinding process monitoring system as defined in claim 1, wherein said control means is operable for adjusting said spacing by moving said measuring window and said substrate surface toward and away from each other within a predetermined range of movement.

4. A grinding process monitoring system as defined in claim 1, wherein said control means is operable for adjusting said spacing by moving said measuring window and said substrate surface toward and away from each other stepwise by every predetermined amount.

5. A grinding process monitoring system as defined in claim 2, wherein said control means is operable for adjusting said outflow quantity of said cleaning liquid by varying said outflow quantity within a predetermined range of quantity adjustment.

6. A grinding process monitoring system as defined in claim 2, wherein said control means is operable for adjusting said outflow quantity of said cleaning liquid by varying said outflow quantity stepwise by every predetermined quantity.

7. A grinding process monitoring system as defined in claim 2, wherein said control means is operable for varying said outflow quantity of said cleaning liquid stepwise by every predetermined quantity within a predetermined range of quantity adjustment, and moving said measuring window and said substrate surface toward and away from each other stepwise by every predetermined amount within a predetermined range of movement, while examining said bubble characteristic variations at each stage of variation in said outflow quantity, to adjust said outflow quantity of said cleaning liquid and said spacing by feedback control, to eliminate said bubble characteristic variations.

8. A grinding process monitoring system as defined in claim 7, wherein said control means is operable for adjusting said outflow quantity of said cleaning liquid by regarding, as a standard outflow quantity, said outflow quantity of said cleaning liquid supplied from said liquid curtain forming means in time of starting outflow adjustment, varying said outflow quantity from said standard outflow quantity in one of a direction for increasing said outflow quantity and a direction for decreasing said outflow quantity, and for adjusting said spacing by regarding, as an initial position, a position relative to said substrate surface taken by said measuring window in time of starting spacing adjustment, moving said measuring window from said initial position in one of a direction for moving said measuring window away from said substrate surface and a direction for moving said measuring window toward said substrate surface.

9. A grinding process monitoring method of measuring thickness of a film applied to a substrate surface, said method comprising the steps of:

forming a liquid curtain of a cleaning liquid in a measurement region between said substrate surface and a measuring window opposed thereto;

emitting measuring light to said substrate surface through said measuring window, receiving reflected light from said substrate surface through said measuring window, and obtaining a spectrum of said reflected light;

examining bubble characteristic variations occurring in said spectrum due to bubbles present in said measurement region;

varying a spacing between said measuring window and said substrate surface to eliminate said bubble characteristic variations; and determining said thickness of said film by analyzing said spectrum.

10. A grinding process monitoring method as defined in claim 9, wherein said thickness of said film is determined by analyzing said spectrum obtained when said bubble characteristic variations have been eliminated.

11. A grinding process monitoring method as defined in claim 10, further comprising the step of varying an outflow quantity of said cleaning liquid to eliminate said bubble characteristic variations.

* * * * *